(12) United States Patent
Mazina

(10) Patent No.: US 8,001,425 B2
(45) Date of Patent: Aug. 16, 2011

(54) PRESERVING STATE INFORMATION OF A STORAGE SUBSYSTEM IN RESPONSE TO COMMUNICATION LOSS TO THE STORAGE SUBSYSTEM

(75) Inventor: Daniel J. Mazina, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 307 days.

(21) Appl. No.: 12/420,438

(22) Filed: Apr. 8, 2009

(65) Prior Publication Data

US 2010/0262861 A1 Oct. 14, 2010

(51) Int. Cl.
*G06F 11/00* (2006.01)
(52) U.S. Cl. ............ 714/42; 714/6.1; 714/15; 714/43; 714/56
(58) Field of Classification Search .................. None
See application file for complete search history.

(56) References Cited

U.S. PATENT DOCUMENTS

| | | | | |
|---|---|---|---|---|
| 5,379,411 A * | 1/1995 | Morgan et al. | ........... | 714/6.1 |
| 5,668,943 A * | 9/1997 | Attanasio et al. | ........... | 714/4.2 |
| 5,968,182 A * | 10/1999 | Chen et al. | ........... | 714/5.11 |
| 6,138,125 A | 10/2000 | DeMoss | | |
| 6,282,610 B1 * | 8/2001 | Bergsten | ........... | 711/114 |
| 6,430,714 B1 | 8/2002 | McAdam | | |
| 6,587,962 B1 * | 7/2003 | Hepner et al. | ........... | 714/19 |
| 6,886,074 B1 | 4/2005 | Narayanaswamy | | |
| 7,624,301 B2 * | 11/2009 | Yamaguchi et al. | ......... | 714/5.11 |
| 2003/0070041 A1 | 4/2003 | Beardsley | | |
| 2003/0101371 A1 * | 5/2003 | Fairhurst et al. | ........... | 714/9 |
| 2008/0126443 A1 * | 5/2008 | Cochran et al. | ........... | 707/204 |
| 2008/0162987 A1 | 7/2008 | El-Batal | | |

OTHER PUBLICATIONS

Detect Hard Drive Failure Before It Happens by Jim Aspinwall, Ecoustics.com, Jul. 8, 2005, (6 pages).
A Fault-Tolerant Architecture for Supporting Large Scale Digital Libraries, Science and Technology Librarianship by Giacomo et al., Summer 2003 (8 pages).
Hard Disk Failure,Wikipedia, Mar. 4, 2009 (2 pages).
Sun StorEdge NAS Clustered Failover, Sun Microsystems, Jun. 2005 (12 pages).
Intransa StorStac Architectural Overview, Feb. 11, 2007 (5 pages).
Veritas Volume Manager Administrator's Guide, Solaris, 5.0 Maintenance Pack 3, Symantec (679 pages).

* cited by examiner

*Primary Examiner* — Gabriel L Chu

(57) ABSTRACT

A storage subsystem has a plurality of storage devices. An indication of failure of at least one of the plurality of storage devices is detected. In response to detecting the indication of failure, monitoring is performed for a further condition. According to the monitored further condition, it is determined whether the at least one storage device has failed or whether communication has been lost to the storage subsystem. In response to determining that communication has been lost, state information of the storage subsystem is preserved to enable restoration of the storage subsystem after communication to the storage subsystem is recovered.

20 Claims, 2 Drawing Sheets

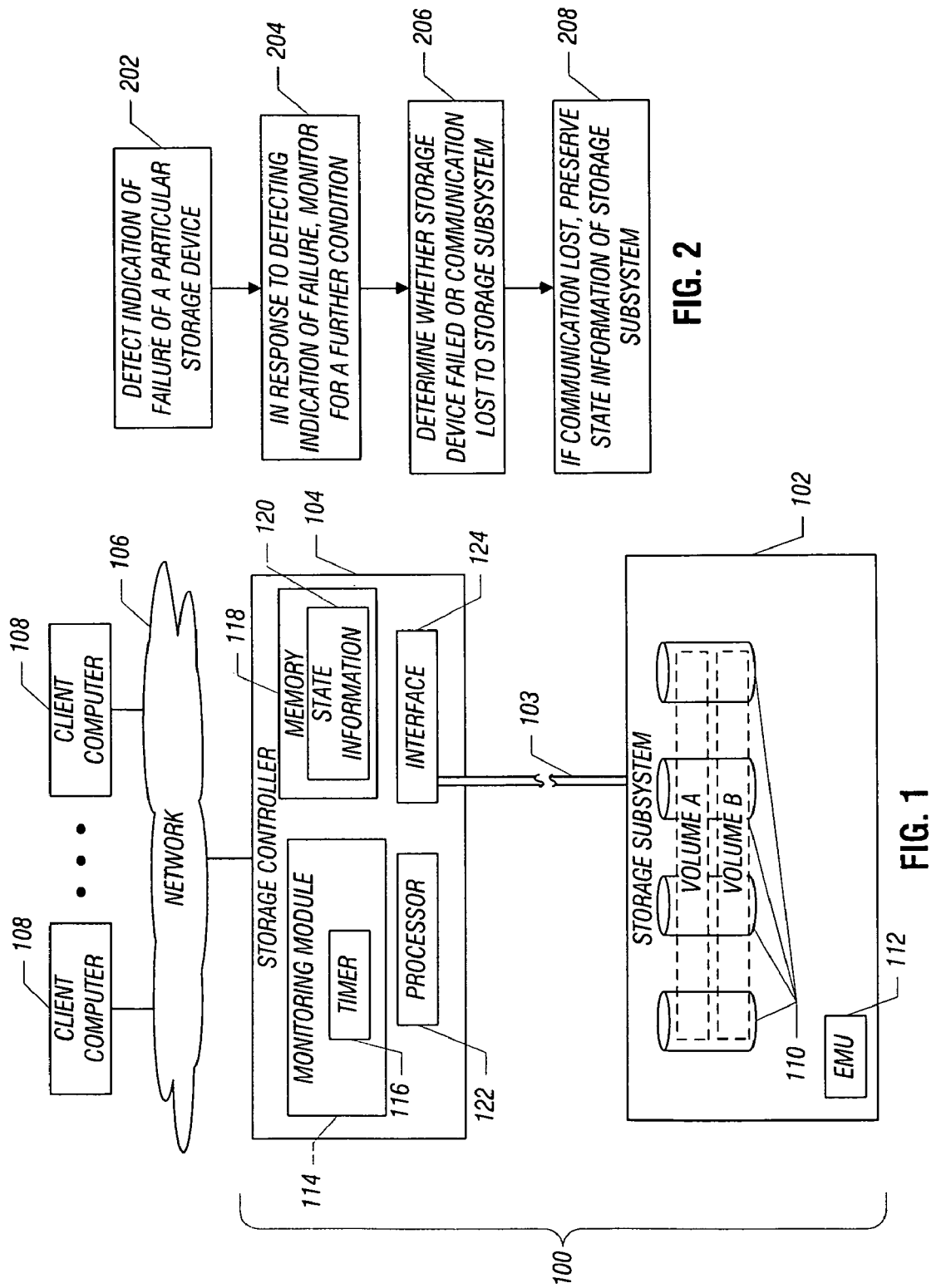

PRESERVING STATE INFORMATION OF A STORAGE SUBSYSTEM IN RESPONSE TO COMMUNICATION LOSS TO THE STORAGE SUBSYSTEM

BACKGROUND

A storage subsystem can be implemented with multiple (e.g. an array of) physical storage devices. A storage volume, which is a logical unit of data, can be implemented across plural physical storage devices. One reason for implementing a storage volume across plural physical storage devices is to provide redundancy, such as redundancy based on mirroring data (in which data of a first storage device is copied to a second storage device to provide redundancy). Another form of redundancy is parity-based redundancy (in which parity information of data stored in a group of storage devices is kept in another storage device). By providing redundancy, if a physical storage device (or any part of a physical storage device) from the multiple physical storage devices were to fail, then the data stored in the storage subsystem can still be recovered under certain conditions.

With a conventional storage subsystem, it may be difficult to recover from a failure condition in which communication is lost to the entire storage subsystem. Typically, when communication to an entire storage subsystem is lost, a manual process is used to attempt to recover the storage subsystem. Such a manual process of storage subsystem recovery is labor-intensive and time-consuming.

BRIEF DESCRIPTION OF THE DRAWINGS

Some embodiments of the invention are described with respect to the following figures:

FIG. 1 is a block diagram of an exemplary arrangement that includes an embodiment according to an invention;

FIG. 2 is a flow diagram of a general process according to an embodiment; and

DETAILED DESCRIPTION

Figure 3:
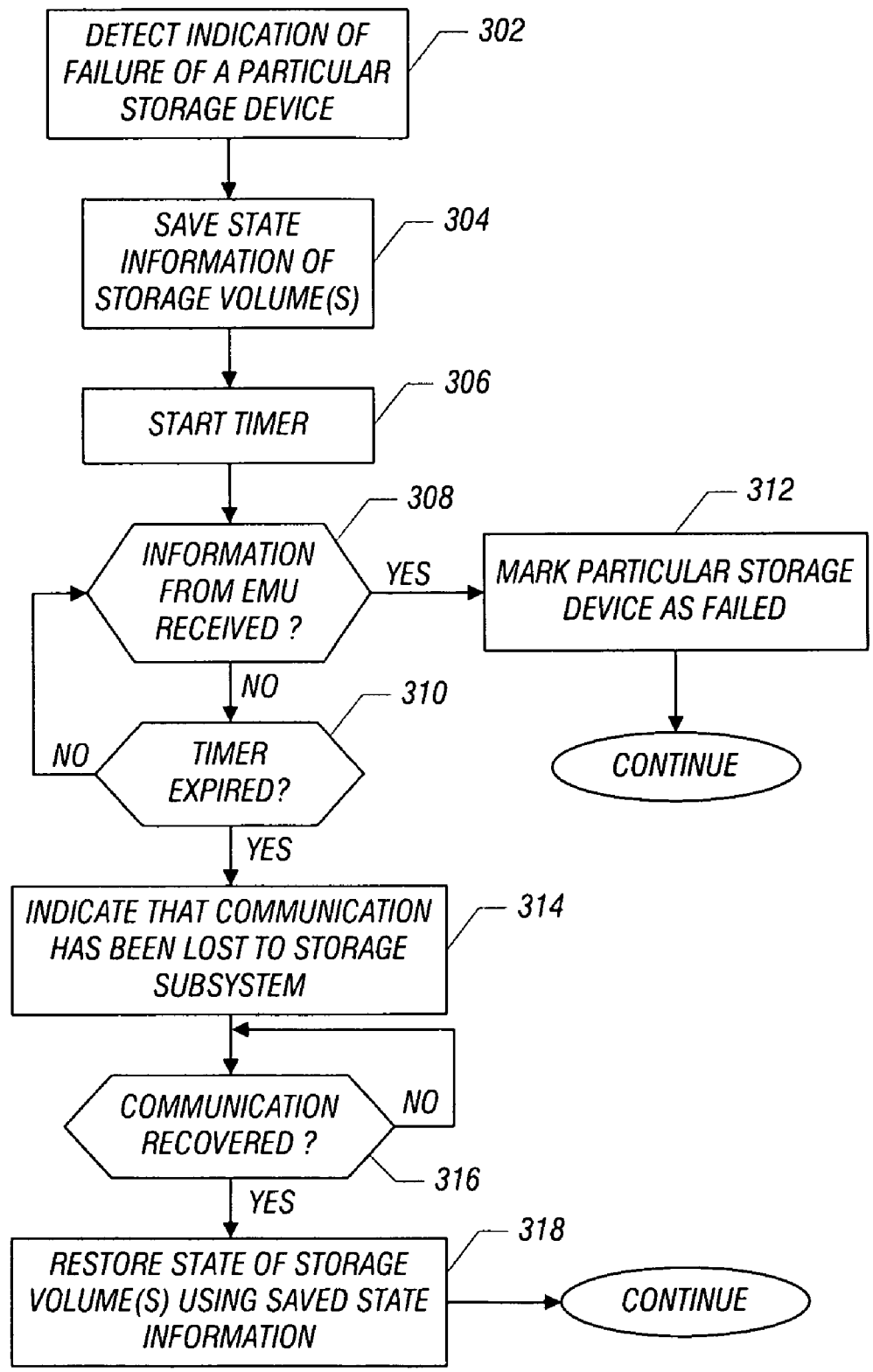
FIG. 3 is a flow diagram of a process of preserving state information of a storage subsystem in response to communication loss to the storage subsystem, and subsequently restoring the storage subsystem, according to an embodiment.

When access (communication) is lost to a storage subsystem that includes multiple storage devices, conventional systems typically mark all storage devices inside the storage subsystem as failed. To recover from such failure, a user typically has to run a management utility to determine which storage devices within the storage subsystem are functional and which storage devices are failed. Such a process can be time-consuming and inefficient.

In accordance with some embodiments, an automated recovery mechanism is provided to efficiently determine whether indications of failure of storage device(s) within a storage subsystem are caused by communication loss to the storage subsystem or is due to actual failure of one or more storage devices. If it is detected that communication loss has occurred to the storage subsystem, state information associated with the storage subsystem can be preserved such that when communication to the storage subsystem is subsequently recovered, the state of the storage subsystem can be restored. In this manner, a user would not have to manually run a utility to identify which storage devices are functional and which are failed, and to restore the system based on such manual identification.

As used here, the term "storage device" refers to a physical storage element, such as a disk-based storage element (e.g., hard disk drive, optical disk driver, etc.) or other type of storage element (e.g., semiconductor storage element). The multiple storage devices within a storage subsystem can be arranged as an array, in some exemplary implementations. More generally, a storage subsystem refers to a collection of storage devices, where such collection of storage devices can be contained within an enclosure (defined by an external housing of the storage subsystem). Alternatively, the storage devices of a storage subsystem can be located in multiple enclosures.

Storage volumes can be defined across multiple storage devices of a storage subsystem. A "storage volume" (or more simply "volume") refers to a logical unit of data that is defined in the storage subsystem. A storage volume that is defined across multiple storage devices allows for redundancy to be provided. Redundancy can be based on mirroring of data, where data in a source storage device is copied to a mirror storage device (which contains a mirror copy of the data in the source storage device). In this arrangement, if an error causes data of the source storage device to be unavailable, then the mirror storage device can be accessed to retrieve the data.

Another form of redundancy is parity-based redundancy where actual data is stored across a group of storage devices, and parity information associated with the data is stored in another storage device. If data within any of the group of storage devices were to become inaccessible (due to data error or storage device fault or failure), the parity information can be accessed to reconstruct the data. Examples of parity-based redundancy schemes include RAID (redundant array of inexpensive disks) schemes, including the RAID-5 and RAID-6 schemes. An example of a mirroring redundancy scheme is the RAID-1 scheme. Although reference is made to RAID in this description, it is noted that some embodiments of the invention can be applied to other types of redundancy schemes, or to any arrangement in which a storage volume is implemented across multiple storage devices (whether redundancy is used or not).

FIG. 1 illustrates an exemplary arrangement that includes a storage arrangement 100 that has a storage subsystem 102 connected by a link 103 to a storage controller 104. The link 103 can be one of several different types of links. As examples, the link 103 can be a SCSI (Small Computer System Interface) link, a serial attached SCSI (SAS) link, a Fibre Channel link, and so forth.

The storage controller 104 is connected to a network 106 (e.g., local area network, storage area network, or other type of network) to allow client computers 108 to access the storage controller 104. The client computers 108 can issue read, write, or other input/output (I/O) requests over the network 106 to the storage controller 104. In response to such requests, the storage controller 104 accesses the storage subsystem 102 to perform the requested accesses. The client computers 108 can be user computers, or alternatively, the client computers 108 can be server computers that are accessible by user computers.

The storage subsystem 102 includes an array of storage devices 110. A number of volumes can be defined across the storage devices 110. In the example of FIG. 1, two volumes are shown, including volume A and volume B. In an alternative implementation, just one volume can be defined across the storage devices 110, or more than two volumes can be defined across the storage devices 110. Although both volumes A and B are deployed across the same set of storage devices 110, it is noted that in an alternative implementation, volume A can be implemented across a first collection of the storage devices 110, and volume B can be implemented across a second collection of the storage devices 110.

The storage subsystem 102 also includes an environmental monitoring unit (EMU) 112, which gathers information relating to the storage subsystem 102 for reporting to the storage controller 104 over the link 103. Examples of information that can be reported by the EMU 112 to the storage controller 104 include one or more of the following: temperature within the storage subsystem 102, hot plug events (in which electronic components such as storage devices have been either removed or inserted into the storage subsystem 102 while the storage subsystem remains live), information relating to fans of a storage subsystem 102, and so forth.

The storage devices 110 and EMU 112 (as well as other components of the storage subsystem 102) can be contained in an enclosure defined by a housing (represented by the rectangular box surrounding the storage devices 110 and EMU 112).

The storage controller 104 includes a monitoring module 114 according to some embodiments for monitoring for failures associated with the storage subsystem 102. The failures associated with the storage subsystem 102 can be loss of communication to the storage subsystem 102, or alternatively, can be failure of individual ones of the storage devices 110.

The monitoring module 114 includes a timer 116 (which is described further below). The storage controller 104 also includes a memory 118 in which state information 120 associated with the storage subsystem 102 can be stored. The storage controller 104 also includes an interface 124 to allow communication with the storage subsystem 102 over the link 103. The interface can include a network interface controller and any communication protocol stacks.

The storage controller 104 can be a processor-based system that includes a processor 122. The monitoring module 114 can be a software module executable on the processor 122. In a different embodiment, the storage controller 104 can be implemented with a hardware device such as an application specific integrated circuit (ASIC), programmable gate array (PGA), and so forth. In this case, the monitoring module 114 can be firmware embedded in the storage controller 104, or alternatively the monitoring module 114 can be implemented as fixed circuitry in the storage controller 104.

FIG. 2 illustrates a general process according to an embodiment. The process of FIG. 2 can be performed by the monitoring module 114 in the storage controller 104 of FIG. 1. The storage controller 104 detects (at 202) an indication of failure of a storage device in the storage subsystem 102. The indication of failure of a storage device can be in response to detecting loss of communication from a storage device. For example, the storage controller 104 may have submitted a request to a particular one of the storage devices 110 in the storage subsystem 102. If the storage device fails to respond after some amount of time, then that is an indication of failure of the storage device.

A storage device can fail for various reasons. A physical component of the storage device may fail, such as failure of a power supply, failure of a mechanical part, and so forth. However, the indication of failure of a storage device may also be caused by loss of communication to the entire storage subsystem 102. The loss of communication may be due to a loose cable connection, or due to a temporary transient condition associated with the link 103. Loss of communication between the storage controller 104 and storage subsystem 102 can also be caused by failure of a communications interface in either the storage controller 104 or storage subsystem 102.

When loss of communication occurs, it may be the case that none of the storage devices 110 are failed; rather, the storage devices 110 of the storage subsystem 102 may be fully functional, and the loss of communication may be a loss that can be recovered at a later point in time by repairing the link 103 or waiting for a temporary transient condition to dissipate. When loss of communication to the storage subsystem 102 occurs, it is undesirable to mark all storage devices 110 in the storage subsystem as failed, since doing so would preclude easy restoration of the storage subsystem 102 when communication to the storage subsystem 102 is later recovered.

In response to detecting an indication of failure of a storage device, the storage controller monitors (at 204) for a further condition. In some embodiments, this further condition relates to whether or not the storage controller 104 is able to receive information from other parts of the storage subsystem 102. If the storage controller 104 is unable to receive further information from other parts of the storage subsystem 102, then that is an indication that loss of communication has occurred to the entire storage subsystem 102, and therefore, no failure of any individual storage device should be made in response to the detected loss of communication.

Based on the monitored further information, the storage controller 104 determines (at 206) whether the storage device has failed or communication has been lost to the storage subsystem. If the communication to the storage subsystem is lost, then the state information of the storage subsystem is preserved (at 208) for later use when communication to the storage subsystem is recovered. This state information can be stored as state information 120 in the memory 118 of the storage controller 104 (FIG. 1).

FIG. 3 is a process of a more specific embodiment of the invention. The storage controller detects (at 302) an indication of failure of a storage device. In response to such indication, the storage controller saves (at 304) state information of one or more storage volumes defined in the storage subsystem 102. The state information of a storage volume includes one or more of the following: information regarding which storage device(s) of the storage volume was previously marked as failed; information relating to which storage device(s) of the storage volume has been replaced; the content of a posted write buffer for the storage volume; information relating to the status of redundancy for the storage volume (e.g., status of building of RAID-5 or RAID-6 parity information, status of mirroring of data for RAID-1 redundancy); and so forth.

A posted write buffer refers to a buffer in the storage controller 104 that is maintained for write requests to a storage volume. When a write request is received from a client device 110 for the storage volume, the write request is stored in the posted write buffer. The posted write buffer is typically a memory that is battery-backed to allow the content of the memory to be preserved even if power of the storage controller 104 is lost. When a write request is posted to the posted write buffer, a response can be returned to the requesting client computer that the write has been completed, even though the write may not actually have been performed to the storage subsystem 102. The write requests in the posted write buffer can be gradually flushed to the storage subsystem 102.

In response to the indication of failure of the storage device (detected at 302), the timer 116 (FIG. 1) of the monitoring module 114 is started (at 306). Next, the storage controller 104 monitors for a further condition. In this case, the further condition includes whether or not information from the EMU 112 (FIG. 1) of the storage subsystem 102 is subsequently received. Thus, the storage controller determines (at 308)

whether information from the EMU 112 has been received. If not, the storage controller 104 next determines (at 310) whether the timer has expired (the timer has counted a transpired time, a transpired number of clock cycles, etc.). If not, the storage controller 104 continues to wait for information from the EMU 112. If information from the EMU 112 is received, then it is confirmed that there is no communication loss to the storage subsystem 102, but rather, that an individual storage device has actually failed. In this case, the storage controller 104 marks (at 312) the individual storage device as failed.

However, if the timer expires (310) before any information is received from the EMU 112, then that is confirmation that communication loss has likely occurred between the storage controller 104 and the storage subsystem 102. In this case, the storage controller 104 indicates (at 314) that communication has been lost to the storage subsystem 102. The state information of the storage volume(s) that has been saved (at 304) is preserved.

The storage controller 104 next determines (at 316) if communication to the storage subsystem has been recovered. If so, the storage volume(s) in the storage subsystem 102 is restored (at 318) using the saved state information.

In this way, an automated and efficient mechanism is provided to distinguish between loss of communication to a storage subsystem versus failure of individual storage devices. If loss of communication to an entire storage subsystem is detected, then individual storage devices are not marked as failed in response to such detected loss of communication. By preserving state information associated with the storage subsystem in response to loss of communication to the storage subsystem, the storage volume(s) of the storage subsystem can later be recovered when communication to the storage subsystem is recovered.

Instructions of software described above (including the monitoring module 114 of FIG. 1) are loaded for execution on a processor (such as processor 122 in FIG. 1). The processor includes microprocessors, microcontrollers, processor modules or subsystems (including one or more microprocessors or microcontrollers), or other control or computing devices. As used here, a "processor" can refer to a single component or to plural components (e.g., one CPU or multiple CPUs).

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method for use with a storage subsystem having a plurality of storage devices, comprising:
   detecting an indication of failure of at least one of the plurality of storage devices;
   in response to detecting the indication of failure, monitoring for a further condition;
   according to the monitored further condition, determining whether the at least one storage device has failed or whether communication has been lost to the storage subsystem; and
   in response to determining that communication has been lost, preserving state information of the storage subsystem to enable restoration of the storage subsystem after communication to the storage subsystem is recovered.

2. The method of claim 1, wherein monitoring for the further condition comprises monitoring to detect whether information is received from an environmental monitoring unit in the storage subsystem.

3. The method of claim 1, wherein preserving the state information comprises preserving state information associated with one or more storage volumes defined across the plurality of storage devices.

4. The method of claim 3, wherein preserving the state information associated with the one or more storage volumes comprises preserving the state information associated with one or more storage volumes in which data redundancy is provided.

5. The method of claim 3, wherein preserving the state information associated with the one or more storage volumes comprises preserving the state information associated with one or more RAID (redundant array of inexpensive disks) volumes.

6. The method of claim 1, further comprising:
   detecting recovery of communication to the storage subsystem; and
   in response to detecting recovery of the communication to the storage subsystem, restoring a state of the storage subsystem using the preserved state information.

7. The method of claim 6, wherein restoring the state of the storage subsystem comprises restoring a state indicating which of the plurality of storage devices has failed.

8. The method of claim 6, wherein restoring the state of the storage subsystem comprises restoring a state of a posted write buffer used to buffer write requests to the storage subsystem.

9. The method of claim 6, wherein restoring the state of the storage subsystem comprises restoring a status of building of redundancy data for a storage volume defined across the plurality of storage devices.

10. The method of claim 1, further comprising:
    in response to detecting from the monitored further condition that the at least one storage device has failed, marking the at least one storage device as failed.

11. A storage controller comprising:
    an interface to communicate with a storage subsystem having a plurality of storage devices; and
    a processor to:
    detect failure associated with the storage subsystem;

in response to the detected failure, determine whether the failure is associated with an individual one of the plurality of storage devices or is caused by communication loss to the storage subsystem;

in response to determining that the failure is associated with the individual one of the plurality of storage devices, mark the individual storage device as failed; and in response to determining that the failure is caused by communication loss to the storage subsystem, preserve state information of the storage subsystem for later use to recover the storage subsystem.

12. The storage controller of claim 11, wherein the detected failure is associated with a first part of the storage subsystem, and wherein the processor is to further:

monitor for communication from a second part of the storage subsystem in response to detecting failure associated with the first part of the storage subsystem;

wherein marking the individual storage device as failed is in response to receiving communication from the second part of the storage subsystem, and wherein preserving the state information of the storage subsystem is in response to detecting that communication from the second part of the storage subsystem has not been received.

13. The storage controller of claim 12, further comprising a timer that is started upon detecting failure associated with the first part of the storage subsystem, wherein the processor is to indicate that communication loss to the storage subsystem has occurred in response to expiration of the timer.

14. The storage controller of claim 12, wherein the second part of the storage subsystem comprises an environmental monitoring unit to send information about the storage subsystem to the storage controller.

15. The storage controller of claim 14, wherein the information received from the environmental monitoring unit includes one or more of temperature information, hot plug event information, and fan information.

16. The storage controller of claim 11, wherein the preserved state information comprises information about a storage volume implemented across the plurality of storage devices.

17. The storage controller of claim 16, wherein the preserved state information includes one or more of: information regarding which storage device of the storage volume was previously marked as failed; information relating to which storage device of the storage volume has been replaced; content of a posted write buffer for the storage volume; and information relating to the status of redundancy for the storage volume.

18. An article comprising at least one non-transitory computer-readable storage medium containing instructions that upon execution cause a storage controller to:

detect failure of a first part of a storage subsystem;

in response to detecting failure of a first part of the storage subsystem, determine if communication from a second part of the storage subsystem is received;

in response to detecting receipt of communication from the second part of the storage subsystem, mark the first part of the storage subsystem as failed;

in response to detecting that communication from the second part of the storage subsystem is not received, mark communication to the storage subsystem as being lost, and preserve state information associated with the storage subsystem to later use for recovering the storage subsystem.

19. The article of claim 18, wherein communication from the second part comprises communication from an environmental monitoring unit of the storage subsystem.

20. The article of claim 18, wherein the instructions upon execution cause the storage controller to further:

after detecting loss of communication to the storage subsystem, detect recovery of communication to the storage subsystem; and in response to detecting recovery of the communication to the storage subsystem, recover a state of the storage subsystem using the preserved state information.

* * * * *